US006367803B1

(12) United States Patent
Loth

(10) Patent No.: US 6,367,803 B1
(45) Date of Patent: Apr. 9, 2002

(54) SEALING GASKET FOR PIPEWORK CONNECTION FLANGE

(76) Inventor: Christian Loth, Les Bruyères la Fresnaie Fayel, 61230 Gace (FR)

( * ) Notice: Subject to any disclaimer, the term of this patent is extended or adjusted under 35 U.S.C. 154(b) by 0 days.

(21) Appl. No.: 09/232,126

(22) Filed: Jan. 15, 1999

(30) Foreign Application Priority Data

Feb. 26, 1998 (FR) .............................................. 98 02341

(51) Int. Cl.[7] ................................................ F16J 15/08
(52) U.S. Cl. ...................... 277/321; 277/616; 277/917; 285/379
(58) Field of Search ................................ 277/317, 321, 277/604, 608, 609, 616, 627, 651, 652, 654, 917, 938; 116/327, 335; 285/379, 18

(56) References Cited

U.S. PATENT DOCUMENTS

| 1,731,404 A | * | 10/1929 | Wetherill | |
|---|---|---|---|---|
| 1,896,795 A | * | 2/1933 | Kendall | |
| 4,059,215 A | * | 11/1977 | Owen et al. ................. | 277/234 |
| 4,095,809 A | * | 6/1978 | Smith | |
| 4,168,852 A | * | 9/1979 | Ahlstone | |
| 4,436,310 A | * | 3/1984 | Sawabe et al. | |
| 4,519,619 A | * | 5/1985 | Doyle ........................ | 277/235 |
| 4,522,536 A | * | 6/1985 | Vidrine ........................ | 277/609 |
| 4,770,044 A | * | 9/1988 | Ferris .......................... | 116/335 |
| 5,031,488 A | * | 7/1991 | Zumeta ....................... | 116/335 |
| 5,118,121 A | * | 6/1992 | Hellman, Sr. | |
| 5,203,576 A | * | 4/1993 | Miyaoh et al. | |
| 5,421,594 A | * | 6/1995 | Becerra ....................... | 277/213 |
| 5,797,604 A | * | 8/1998 | Inagaki et al. .............. | 277/618 |
| 5,803,465 A | * | 9/1998 | Schweiger ................... | 277/593 |
| 5,879,011 A | * | 3/1999 | Takata et al. ................ | 277/593 |

FOREIGN PATENT DOCUMENTS

| DE | 17 55 658 | | 11/1957 | |
|---|---|---|---|---|
| DE | 21 05 381 | | 3/1972 | |
| DE | 27 38 244 | | 3/1979 | |
| DE | 78 35 369 | | 10/1983 | |
| GB | 2 229 047 | | 9/1990 | |
| JP | 402286859 A | * | 11/1990 | |
| WO | WO 93/084420 | * | 4/1993 | ............ F16J/15/08 |

\* cited by examiner

*Primary Examiner*—Anthony Knight
*Assistant Examiner*—Vishal Patel
(74) *Attorney, Agent, or Firm*—Piper Marbury Rudnick & Wolfe

(57) ABSTRACT

A sealing gasket (J) intended to be damped between two pipework connection flanges (5, 9), the said gasket comprising a sealing ring (1) including a rigid metal annular part (11, 13, 18, 16) with which are integral a number of radiating metal lugs (2) capable of being folded along the contour of a support flange. The sealing gasket having to be able to be mounted between flanges of different transverse dimensions, the metal lugs (2) are longer than the corresponding transverse dimension of the largest flanges on which the gasket can be mounted. The lugs can thus be folded to conform with the exact dimension of an assembly flange so that the gasket may be suitably supported centered by the said flange prior to the mutual assembly and tightening of the two flanges.

6 Claims, 2 Drawing Sheets

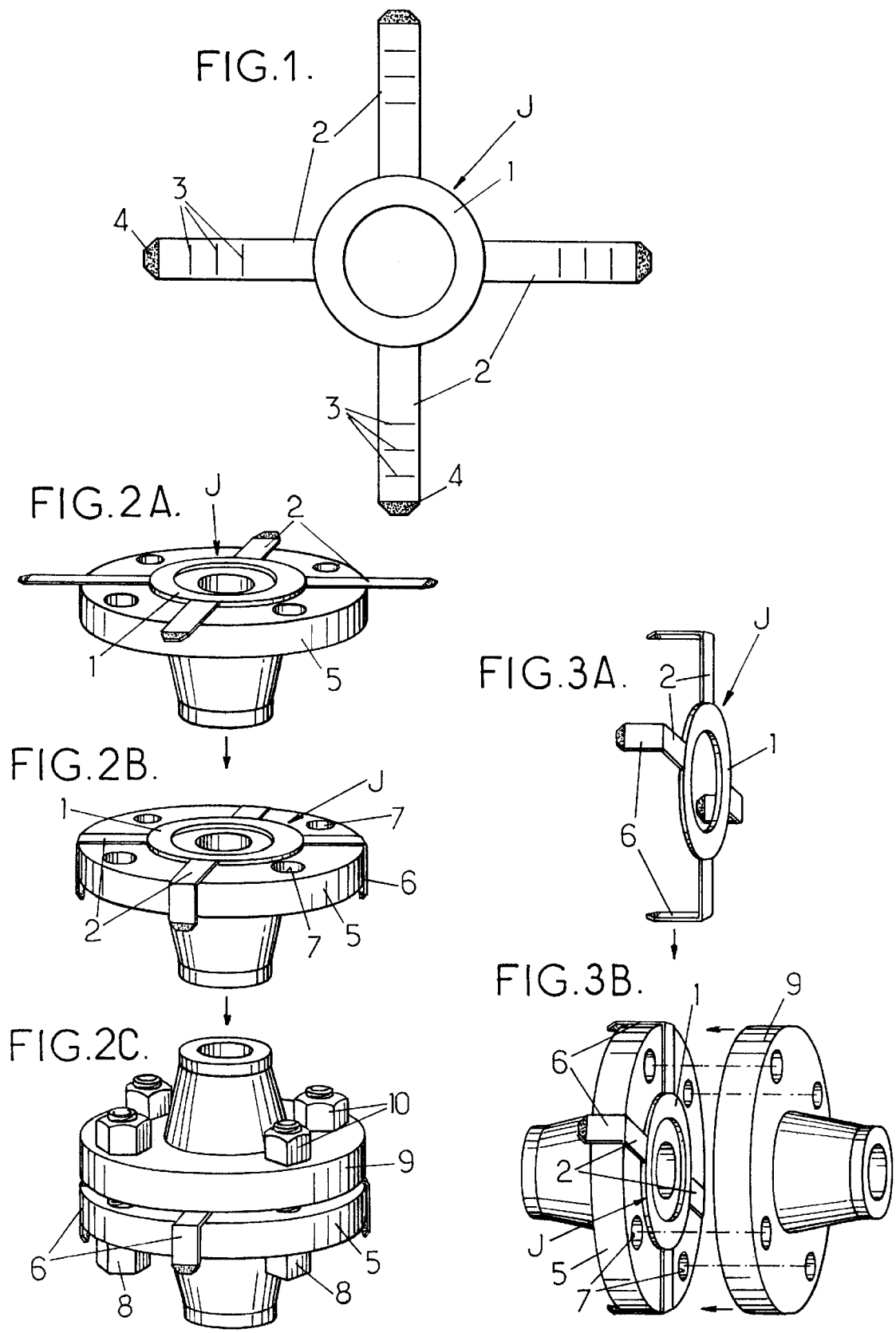

SEALING GASKET FOR PIPEWORK CONNECTION FLANGE

The present invention concerns improvements made to sealing gaskets intended to be clamped between two pipework connection flanges and the invention relates more particularly to gaskets of this kind which comprise a sealing ring Including a rigid metal annular part with which are integral several radiating metal lugs capable of being folded along the contour of a support flange.

In the area of industrial pipework, in particular in the chemical and oil industries, pipelines may be constituted of sections of piping connected end to end by means of flanges between which are placed sealing gaskets. A particular feature of these gaskets is that their dimensional characteristics (internal diameter in particular) correspond with the diameter of the flanges, which in their turn correspond with the diameter of the pipe and the nominal admissible pressure. These respective dimensions may be standardised.

The result of this general arrangement is that each pipe diameter has a corresponding flange diameter and therefore gasket diameter.

Additionally, the gaskets can only be used within the limitations of a nominal pressure for which they have been designed.

Given these constraints, in order to cover a great number of different applications, a substantial range of gaskets of different diameters and withstanding different nominal pressures have to be kept available, which obliges the manufacturer and the user to maintain a bulky stock of materials in storage.

Lastly, the gaskets currently in use have other drawbacks, particularly: the impossibility of checking the characteristics of a gasket in place between the tightened flanges; the possibility of re-using a gasket which has already been used and has already been compressed; the impossibility of checking the correct centring of the gasket from the time the two flanges are brought to face each other on either side of the gasket.

The object of the Invention is thus essentially to propose a simple technical solution which can better meet the different needs of practice and which can eliminate, or at least reduce the different aforementioned drawbacks, by proposing an original structure for a sealing gasket for flanged industrial pipework which can be used for a whole range of flanges of different diameters so as to reduce the stocks of materials kept in store both by the manufacturer and by the user, which is easy to position and whose centring can be checked even on vertical flanges, which enables its characteristics to be checked after assembly between the flanges, which can no longer be re-used after dismantling, and which in the final analysis retains the mechanical and sealing characteristics of prior gaskets and involves no appreciable extra cost to manufacture.

To these ends, a sealing gasket as mentioned in the preamble is characterised, when arranged in accordance with the invention, in that, since the sealing gasket has to be able to be mounted between flanges of different transverse dimensions, the metal lugs have a length exceeding the corresponding transverse dimension of the largest flanges on which the gasket can be mounted, by means of which arrangement the lugs can be folded to conform with the exact dimension of an assembly flange so that the gasket can be appropriately supported centred by the said flange prior to the mutual assembly and tightening of the two flanges.

To be sure, sealing gaskets are already known for flanges which are fitted with radiating lugs which can be folded to about 90° (see for example DE-U-78 35 369, DE-A-27 38 244). However, in these known gaskets, the foldable lugs are solely intended to support the gasket on a flange of given dimension and possibly to fix it to it. In no event do the lugs enable the gasket to be mounted on flanges of different diameters.

On the contrary, thanks to the particular configuration of its lugs, a gasket in accordance with the invention can be mounted equally well on a plurality of flanges of different dimensions (flanges belonging to a given dimensional range; flanges corresponding to different standardisations; etc.)

In these conditions, it is quite conceivable to constitute a gasket of diameter and mechanical characteristics appropriate to the fitting of flanges of different diameters capable of supporting pressures in a given fork. Thus, in a typical example, provision may be made for the implementation of only two different types of gaskets with the same external diameter, namely:

low-pressure gaskets for nominal pressures up to 100 bar/mm, high-pressure gaskets for nominal pressures between 150 and 420 bar/mm.

It is desirable for the lugs to comprise reference markers corresponding to the prespecified dimensions of flanges so as to facilitate their folding to the exact dimension for the purpose of correct centring of the gasket on the flanges during its installation.

In a practical version, the radiating lugs are four in number, approximately diametrically opposite two by two and mutually offset angularly by about 90°.

Lastly, it is advantageous for at least one radiating lug to comprise particularly alphanumeric and/or colour marks, to identify the category of gasket, these marks being affixed to the end of the lug which protrudes and remains visible outside the assembled flanges.

Such an arrangement of radiating lugs, which are to advantage added by welding onto the metal annular part of the gasket, offers the considerable advantage of leaving intact the part forming the actual sealing gasket: this can therefore continue to be constituted like a prior gasket of the same type and continue to have the same functional characteristics.

In part, the arrangements specific to the invention can be applied to gaskets of different types, i.e. gaskets in which the above-mentioned rigid annular part constitutes a rigid core of the gasket, or also to gaskets in which the rigid annular part is a rigid ring externally surrounding the gasket and being of smaller thickness than the latter: gaskets provided in accordance with the invention can thus retain the anticrush component.

In the final analysis, the arrangements in accordance with the invention enable:

simplified and accelerated positioning of the gasket on a flange, even one placed vertically, error reduction when choosing which gaskets to fit, simplification and reduction of manufacturing and storage costs for the manufacturer, simplification and reduction of the range of products to use and reduction in storage cost for the user.

The arrangements of the invention find a more specifically advantageous, although not exclusive, application, in so-called "coated metal jacketed gaskets which comprise an annular filler forming a core surrounded by a metal sheath which is coated, on its two main opposite faces, with respective layers of a non-stick material, the said gasket being able if necessary to be fitted with an external metal ring.

It will also be noted that the implementation of the arrangements of the invention does not depend in any way on the structure of the internal contour of the gasket, particularly on the presence or absence of an internal metal centring and/or anti-crush ring.

The Invention will be better understood by reading the following description of some preferred embodiments given solely as non-restrictive examples. In this description reference is made to the appended drawings in which:

FIG. 1 is a purely diagrammatic plan view of a gasket arranged in accordance with the invention;

FIGS. 2A, 2B and 2C show in perspective the implementation of the gasket in FIG. 1 on a horizontal flange;

FIGS. 3A and 3B show, in perspective, the installation of the gasket in FIG. 1 on a vertical flange.

Figure 4:
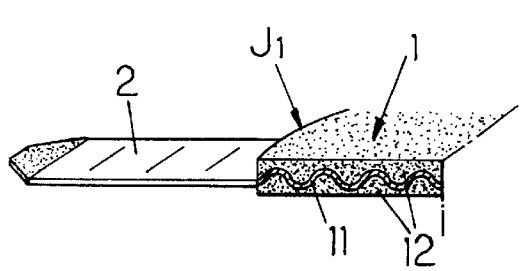
FIGS. 4 to 7 show, in a partial cross-section, different arrangements of gaskets fitted in accordance with the invention.

In FIG. 1 is shown diagrammatically an annular sealing gasket J intended to be clamped between two industrial pipework connection flanges, for example in the chemical or oil industry. This gasket J comprises a sealing ring 1 including a rigid metal annular part (not shown in FIG. 1) different examples of which will be given below.

A number of radiating metal lugs 2 are integral with the aforementioned rigid annular part (being in particular welded to it, but also being able to be of a single piece with it) and are each approximately longer than the transverse dimension of the largest of a group of flanges intended to be fitted with the said gasket.

These lugs can be of any number but the solution which seems the most effective both technically and economically consists in the provision of four lugs, approximately diametrically opposite two by two and mutually offset angularly by about 90°.

Each lug 2 may comprise to advantage etched or painted markers 3, which are placed to correspond with (theoretically standardised) flange diameters. Possibly some of these markers, or other markers independent of these can be provided, or even pre-marked to constitute a mechanically weakened line, for the purpose of cutting off the lug if it is too long or is likely to be in the way after assembly on the flange.

Moreover, the lugs may be painted, wholly or partially in a coded way as a function for example of the gasket diameter and/or the nominal pressure and/or any other information (date of laying for example).

Other particularly alphanumeric and/or colour marks may be provided on each lug in a predetermined place on the latter (for example a differently painted end 4), so as to provide another piece of coded information, for example about the category of gasket, the nominal pressure of the gasket, its structure, and the date it was laid etc.

It will be noted here that the above mentioned pre-marked markers 3 cause a localised weakening of the lug; the lug cannot then withstand repeated folding and unfolding, or it will break. The result is that, in practice it is impossible to reuse a gasket which has already once been assembled, which ensures against a multiple use, deliberate or involuntary, of a same gasket.

Referring now to FIGS. 2A to 2C, when the flange 5 to be fitted with the gasket J is placed horizontally, the gasket J may be laid, with lugs 2 opened out on the surface of the flange 5 in a centred position using for this purpose markers provided on the lugs so that all the lugs 2 protrude to the same extent beyond the peripheral edge of the flange 5 (FIG. 2A).

Once the correct centring is obtained, the lugs 2 are folded back against the periphery of the flange 5, without moving the gasket J relative to the flange (FIG. 2B). The folded back ends 6 then appear over the periphery of the flange 5.

The fixing bolts 8 are then set in the flange holes 7 provided for this purpose, then the counter flange 9 which is automatically centred by the bolts 8 is placed on the flange 5; lastly the tightening nuts 10 are tightened on the bolts 8 so that the flanges 5 and 9 clamp the sealing ring 1 of the gasket J with a pre-specified force (FIG. 2C.). In this position of assembly it can be seen that the folded back ends 6 of the lugs 2 remain in view and that the marks that they contain (colour zones, etched or painted signs etc.) remain in view: it is therefore possible to read these marks without dismantling the flanges.

When the flange 5 is in the vertical position the first step is to locate, on the lugs 2 of the gasket J, the position which will correspond with the peripheral edge of the flange, the lugs are then folded in the places thus located (FIG. 3A). The gasket is then set in place against the vertical surface of the flange 5, the folded back ends 6 of the lugs clamping the periphery of the flange 5 and restraining the gasket J on it (FIG. 3B). The assembly of the counter flange 9 and the tightening of the gasket J can then be completed.

Clearly, in the previous case of a horizontal flange 5, it is also possible to start with the stage of locating and folding of the lugs 2 before positioning the gasket J on the flange.

The above explanations give an idea of the numerous essential advantages of lugs 2 which are integral with the sealing ring 1 of the gasket J.

It becomes straightforward to centre the gasket J on the flange 5, whatever the situation, horizontal and especially vertical, of the gasket. Additionally, the gasket is restrained by the lugs 2 in the said centred position on the flange 5 when the latter is vertical. In this way the risks of position errors and the risks of uncontrolled shifting of the gasket between its installation and the application of the counter flange are avoided.

The protruding of the ends 6 of the lugs 2 enables visual checking, after tightening and possibly during use, of the retention of the gasket J in the centred position. Additionally the colour codings and/or inscriptions appearing on the ends 6 of the lugs 2 enable immediate and rapid checking of the characteristics of the gasket, of its age etc.

It is also easy to see that a gasket arranged in accordance with the invention is no longer tied to an exact flange dimension but may be mounted on flanges of different dimensions in a pre-specified dimensional fork, the sealing ring 1 being then designed to support the highest corresponding pressure anticipated for the corresponding range of flanges and pipework.

The arrangements specific to the invention have additionally the advantage of not being linked to one specific gasket type, but of being able to be implemented with any type of gasket which has a metal part (rigid core) accessible at its outer periphery as is apparent in the few examples which follow.

In FIG. 4 is shown, fragmentarily and in perspective with a transverse cross-section, a gasket J1 called a "corrugated gasket" comprising a sealing ring 1 including a corrugated metal annular core 11 coated on either side with two coatings of graphite 12. The lugs 2 are then fixed by welding to the edge of the metal core 12 appearing on the external edge of the sealing ring 1.

Figure 5:
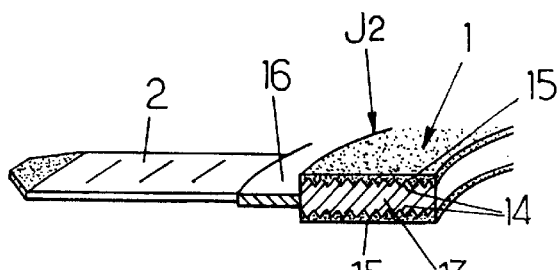
Figure 6:
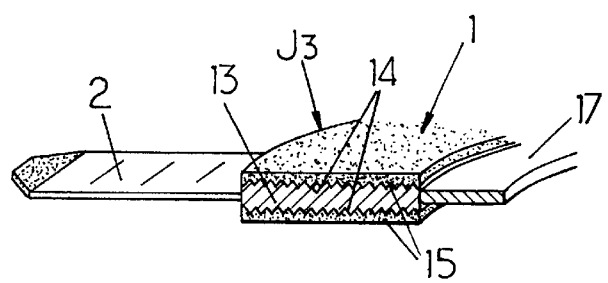

In FIG. 5 is shown in the same way the gasket J2 called a "grooved gasket" comprising a sealing ring 1 including a metal annular core 13 the main opposite faces of which 14 are grooved and coated with respective layers of graphite 15. In the example shown the sealing ring 1 is moreover provided with an external metal ring 16 (for example an anti-crush ring of a thickness calibrated lower than that of the sealing ring) to which the lugs 2 are added. When the gasket is not equipped with an external ring 16, the lugs 2 are added directly to the external edge of the metal core 13 as is shown in FIG. 6 for gasket J3 (the latter is shown equipped, as an example, with an internal metal centring ring 17).

Figure 7:
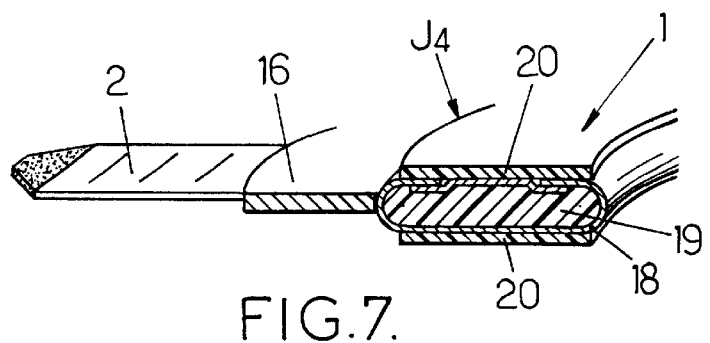

The invention has a particularly advantageous application in coated metal Jacketed gaskets J4 shown in FIG. 7, which comprises a sealing ring 1 consisting of an annular metal sheath 18, for example of stainless steel which surrounds an inner filler 19 forming a core, for example of expanded graphite and which supports on its two opposite annular faces respective layers of non-stick coating 20, for example of graphite or synthetic material such as polytetrafluoroethylene. An external anti-crush ring 16 and/or an internal ring may be fixed to the sheath 18. The lugs 2 are fixed either directly onto the sheath 18 if no anti-crush ring is provided, or onto the external ring 16 if one is present.

What is claimed is:

1. A sealing gasket intended to be clamped between two pipework connection flanges, said gasket comprising a sealing ring including a rigid metal annular part, with which are integral a number of radiating metal lugs which can be folded along the contour of a support flange, wherein, said sealing gasket having to be able to be used with flanges of different transverse dimensions, said metal lugs are longer than the corresponding transverse dimension of the largest flanges on which the gasket can be mounted and are provided with markers corresponding to pre-specified dimensions of flanges, whereby, before the gasket is mounted on a flange, the lugs can be folded to conform with the exact dimension of said flange so that the gasket may be supported by said flange while being suitably centered before the two flanges are connected together.

2. A gasket according to claim 1, wherein alphanumeric and/or color marks identifying the category of the gasket are provided on an end of at least one lug which protrudes beyond the connected flanges and which remains in view after the flanges have been connected together with the gasket interposed therebetween.

3. A gasket according to claim 1, wherein the radiating lugs are four in number, approximately diametrically opposite two by two and mutually offset angularly by about 90°.

4. A gasket according to claim 1, wherein said rigid annular part is a rigid core of the gasket.

5. A gasket according to claim 1, wherein said rigid annular part is a rigid ring externally surrounding the gasket and being of smaller thickness than said gasket.

6. A gasket according to claim 1, wherein said gasket is a coated metal jacketed gasket comprising an annular filler forming a core surrounded by a metal sheath coated, on its two main opposite faces, with respective layers of a non-stick material, said gasket being able to be provided with an external metal ring.

* * * * *